US00RE40437E

(19) United States
(12) Reissued Patent
Rosen

(10) Patent Number: US RE40,437 E
(45) Date of Reissued Patent: Jul. 15, 2008

(54) THERMOSTAT SYSTEM WITH REMOTE DATA AVERAGING

(76) Inventor: Howard Rosen, 1 Lyncroft Road, Montreal Quebec (CA), H3X 3E3

(21) Appl. No.: 11/804,324

(22) Filed: May 16, 2007

Related U.S. Patent Documents

Reissue of:
(64) Patent No.: 7,058,477
Issued: Jun. 6, 2006
Appl. No.: 10/995,574
Filed: Nov. 23, 2004

(51) Int. Cl.
*G05D 23/00* (2006.01)

(52) U.S. Cl. ..... 700/277; 700/276; 236/1 C; 236/51

(58) Field of Classification Search ..... 700/276–278; 236/1 C, 51, 91 F, 91 R
See application file for complete search history.

(56) References Cited

U.S. PATENT DOCUMENTS 4,205,381 A * 5/1980 Games et al. ..... 700/277
4,522,336 A * 6/1985 Culp ..... 236/46 R
4,860,950 A * 8/1989 Reeser et al.
5,170,935 A * 12/1992 Federspiel et al. ..... 236/44 C
5,197,668 A * 3/1993 Ratz et al. ..... 236/51
5,341,988 A * 8/1994 Rein et al. ..... 236/49.3
5,407,002 A * 4/1995 Voll
5,644,302 A * 7/1997 Hana et al.
5,801,940 A * 9/1998 Russ et al. ..... 700/9
6,338,437 B1 * 1/2002 Kline et al. ..... 236/49.3
6,536,675 B1 * 3/2003 Pesko et al. ..... 236/47
2003/0216838 A1 * 11/2003 Dudley ..... 700/277

* cited by examiner

*Primary Examiner*—Alexander Kosowski
(74) *Attorney, Agent, or Firm*—Marc E. Hankin; Hankin Patent Law, APC

(57) ABSTRACT

A thermostat system according to the invention includes: a central control device (typically a programmable thermostat with a processor having: a CPU, real time clock and a memory for storing a control program and data information), multiple rooms comprising a conditioned space, environmental control equipment, and multiple environmental sensors capable of sensing an environmental condition (such as temperature, humidity, or other condition). The sensors are associated with transmission means, which control transmission of sensor signals, and occupancy sensors. Each sensor measures a local environmental condition. Occupancy sensors comprise infrared or other motion sensors, light detection sensors, door opening sensors, and other such sensors that detect the presence of humans in a room of the conditioned space where its associated sensor is located. Space conditioning equipment is activated by comparison of a setpoint to a control value averaged from values of environmental conditions in occupied rooms.

15 Claims, 4 Drawing Sheets

THERMOSTAT SYSTEM WITH REMOTE DATA AVERAGING

Matter enclosed in heavy brackets [ ] appears in the original patent but forms no part of this reissue specification; matter printed in italics indicates the additions made by reissue.

FIELD OF THE INVENTION

This invention relates to the art of thermostats and, more particularly, to a thermostat system incorporating a central control device receiving remote environmental sensing data from remote sensors.

BACKGROUND OF THE INVENTION

Thermostats have been used for many years as a temperature sensitive switch which controls heating and/or cooling equipment for conditioning a space in which the thermostat, or a temperature sensor connected to the thermostat, is placed. In the well known manner, a simple thermostat can be adjusted to establish a temperature set point such that, when the temperature in the conditioned space reaches the set point, the thermostat interacts with the heating and/or/cooling equipment to take suitable action to heat or cool the conditioned space as may be appropriate for the season.

Modern thermostat systems, which take advantage of the ongoing rapid advances in electronic technology and circuit integration, have many features which provide more precise supervision of the heating and/or cooling equipment to achieve more economical and more comfortable management of the temperature of a conditioned space. Many modern thermostat systems include a real time clock, a memory and a data processor to run a process control program stored in the memory to accurately measure the temperature of a temperature sensor disposed in the conditioned space and to send control signals to the heating and/or cooling equipment to closely control the temperature of the conditioned space. Modern thermostat systems permit anticipating and minimizing hysterisis or overshoot of the temperature in the conditioned space. In addition, the program can specify different set points at different times of the day and week and may also include a "vacation" mode which employs different set points when the conditioned space is not occupied for an extended period.

Many modern thermostat systems have a central control device or unit that receives environmental sensor data from sensors remote from the central control device. These sensors can detect temperature, humidity, or other parameters that may be used in a control program by the central control device to control environmental control equipment. The environmental control equipment (comprising HVAC equipment, among others) responds to signals from the central control device to affect the ambient comfort in rooms of a conditioned space. Typically, a remote sensor signal is received by the central control device and its value compared with that of a pre-set setpoint. If the sensor value is sufficiently different from the setpoint, environmental control equipment is activated or de-activated in response thereto. Remote sensors can be connected by wire directly to the central control device or by wireless connection so that the control program can store the output of each sensor and associate it with an identifier for the remote sensor where the output originated.

Modern programmable thermostat systems also may act to control temperature in some rooms of out of all those in a conditioned space as a "zone". Unfortunately, zone control requires dedicated equipment for the zone or duct dampers or deflectors to direct conditioned air to the zone rooms. This requires complexity and additional cost to the system. One form of zone control uses storage in a central control device storing all the signals from multiple remote environmental sensors in the zone. The control program calculates an average value from the stored values of the remote sensors and uses that average value as a control value. The control value is compared with a setpoint, whereafter environmental control equipment is activated or de-activated. The control value established by prior art thermostat systems can easily over- or under-condition a room where a user most desires environmental control.

There is a need for zone control in a thermostat system where remote sensor values are averaged for occupied rooms at a central control device. The averaged sensor data establish a zone control value. This zone control value more accurately reflects environmental conditions of rooms where the user most desires control of those environmental conditions.

SUMMARY OF THE INVENTION

A thermostat system according to the invention includes: a central control device (typically a programmable thermostat with a processor having: a CPU, real time clock and a memory for storing a control program and data information), multiple rooms comprising a conditioned space, environmental control equipment, and multiple environmental sensors capable of sensing an environmental condition (such as temperature, humidity, or other condition). With exception of those provided within or close to a housing of the central control device, environmental sensors are located remote from the central control device. "Remote" as used herein means effectively remote from the central control device as to a sensed environmental condition. A remote sensor may be located in another room as compared with the central control device. Alternately, a remote sensor may be located some distance away from the central control device in a large room. A communications interface is adapted to establish reception of signals (via wired or wireless connections) between the processor and the environmental sensors.

In one embodiment, the sensors are associated with transmission means, which control transmission of sensor signals, and occupancy sensors. Each sensor measures a local environmental condition. Occupancy sensors comprise infrared or other motion sensors, light detection sensors, door opening sensors, and other such sensors that detect the presence of humans in a room of the conditioned space where its associated sensor is located.

In one form of the invention, transmission means enables transmission of environmental sensor signals to the central control device only upon input of signals from the occupancy detector. In another form of the invention, transmission means provide continuous transmissions from environmental sensor signals to a central control device, albeit where such signals are associated with indications of occupancy or non-occupancy of a room where the sensor is located sensing occupancy of a room or an area of a large room. Such remote sensor signals are transmitted to the central control device and stored in its memory as a table of data indicating environmental conditions only in occupied rooms. The values of this table are averaged in one of several selected modes to yield a control value. This control value more accurately reflects the desired environmental conditions of the rooms where user's are present. Alternately, all sensor data may be stored at the central control device and associated with indications of occupancy or non-occupancy of a room where the sensor is located and a time of the sensing of the environmental condition and occupancy status of the room.

In a second embodiment, remote sensors and occupancy detectors are associated as in the first embodiment. However, this second embodiment comprises transmission means that causes transmission of environmental sensor signals to the central control device with additional signals indicating whether the sensor signal originates from an occupied or non-occupied room. Transmission means may transmit continuously, periodically or upon the occurrence of a sensed event. The occupancy status of the room is determined by the input to the transmission means of the occupancy sensor. These remote sensor signals are transmitted to the central control device and stored in its memory as a table of data indicating environmental conditions of both occupied and un-occupied rooms. The values of this table are averaged in one of several selected modes to yield a control value. This control value more accurately reflects the overall desired environmental conditions of the rooms where user's are present.

A user may optionally select from one of several forms of averaging of sensor data to derive a control value. The control program may cause a display screen connected with the CPU to provide a user with a list of averaging options, where by the user can select one of the options through a user interface with touch sensitive buttons or other well known means.

Averaging of sensor data may be accomplished by one of several methods. The sensor data table may contain sensor data from sensors located at the central control devices as well as from remote sensors. Simple averaging of sensor data associated with room occupancy occurs when all environmental sensor data are added together and divided by the number of data items in the table.

A second form of averaging uses weighting depending on square footage of the room where the sensor is located. Greater weighting is assigned to sensor data associated with occupancy in rooms with greater relative square footage.

A third form of averaging uses sensor data from occupied and unoccupied rooms and assigns greater weight to sensor data from occupied rooms.

A fourth form of averaging uses historical data to determine rooms most heavily occupied over a pre-determined period (such as a week or month) and averages current sensor data only from those heavily occupied rooms to arrive at a control value regardless of current occupancy status.

Current thermostat systems can include mobile remote temperature sensors with wireless transmitters. These mobile temperature sensors send sensed, local temperature signals to a central control device and are usually battery powered and enclosed in a handheld housing. The mobile sensors can include a display of locally sensed temperature. In one form of the invention, mobile sensors detect room occupancy and also have means to detect motion of the device itself relative to its surroundings. Without such means, movement of the mobile sensor by a user would result in a false indication of occupancy to the occupancy sensor. For example, an infra-red motion detector in the mobile sensor would falsely interpret carrying the mobile sensor from one room to another as the presence of a person moving in a room. Instead, transmission means are connected to a device motion sensor. The device motion sensor in one form comprises a circuit that opens, closes or alternates between those states when the mobile sensor is picked up and moved. A set of fixed contacts for the circuit can be arranged so that rolling or sliding metallic pieces in an enclosed cavity break or complete the circuit when the device itself is picked up and carried to another room. The transmission means delays receipt of inputs from the occupancy sensor until the mobile sensor has come to rest and/or after a predetermined period of time. These adaptations allow the mobile sensor to come to rest before setting room occupancy and thereafter transmitting local environmental conditions.

It is a feature of some modern thermostat systems to control duct dampers or diverters so that conditioned air from air handlers and fans is directed only to certain rooms of a conditioned space. In the present invention, occupancy sensed in a room creates a signal via the occupancy sensor which is transmitted from a remote device to the central control device. The central control device can act to average temperatures to calculate a control value and at the same time divert substantially all conditioned air only to the occupied rooms.

In some situations, environmental conditions in separated but occupied rooms may be quite different. A side of a building with its wall receiving full sun can dramatically heat a room on that side. A room on the opposite side of the building may be quite cool and have a temperature close to a desired setpoint. Simple averaging of local temperatures in those rooms may result in a control value near a desired setpoint for the central control device. A fifth form of averaging would cause the data table values of sensed environmental conditions to be subtracted from the setpoint to calculate a table of differences, some positive and some negative depending on the relationship of a sensor value to the setpoint. Differences beyond the setpoint value at which environmental control equipment is activated (such as the setpoint temperature at which air conditioning equipment is turned on) would be averaged and given greater weight than an average of differences outside of that activation range. For example, temperature sensors might indicate degree Fahrenheit temperatures of 80, 79, 77 and 75. If the setpoint is 78 for air conditioning to be turned on, the differences would be 2, 1, −1 and −3. Simply averaging the sensor values would not result in the overheated rooms being cooled. In one scenario, the positive differences are weighted 70% and the negative differences at 30%. The resulting control value will be sufficient to activate the air conditioning at the cost of overcooling some occupied rooms.

It is an object of the invention to average sensed environment conditions only in occupied rooms in order to calculate a control value.

DESCRIPTION OF THE PREFERRED EMBODIMENT(S)

Figure 1:
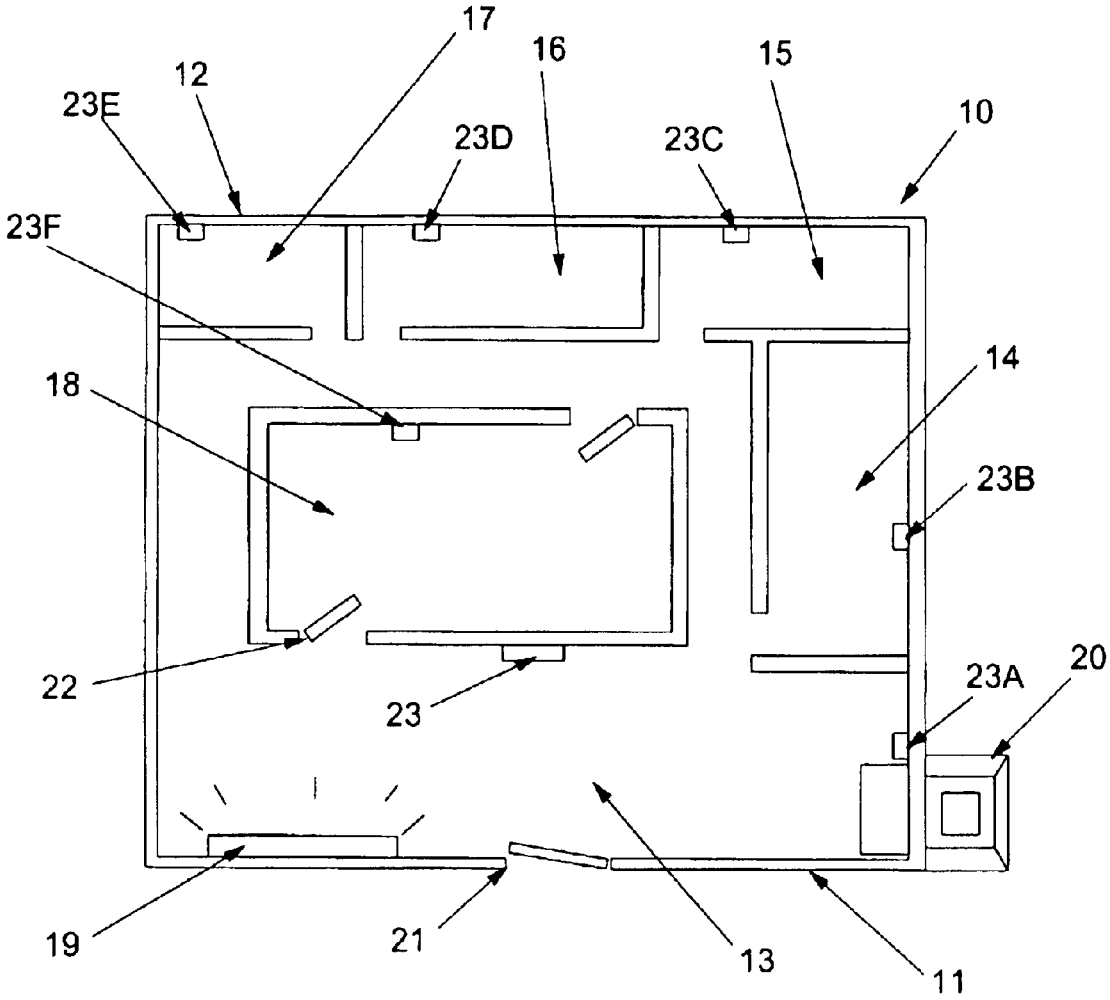
FIG. 1 is a plan view of a conditioned space with several rooms, a central control device and remote environmental sensors arranged in the rooms.

Referring first to FIG. 1, a structure 10 defines within its walls conditioned space for a thermostat system. Structure 10 comprises sides 11 and 12, rooms 13 through 18, lighting fixture 19, fireplace 20, and exemplary doors 21 and 22. The thermostat system includes central control device 23 and remote sensors 23A through 23F. Remote sensors 23A through 23F are located respectively in rooms 13 through 18. Alternately, any of the remote sensors 23A through 23F may be mobile sensors capable of being moved to any room in structure 10.

Figure 2:
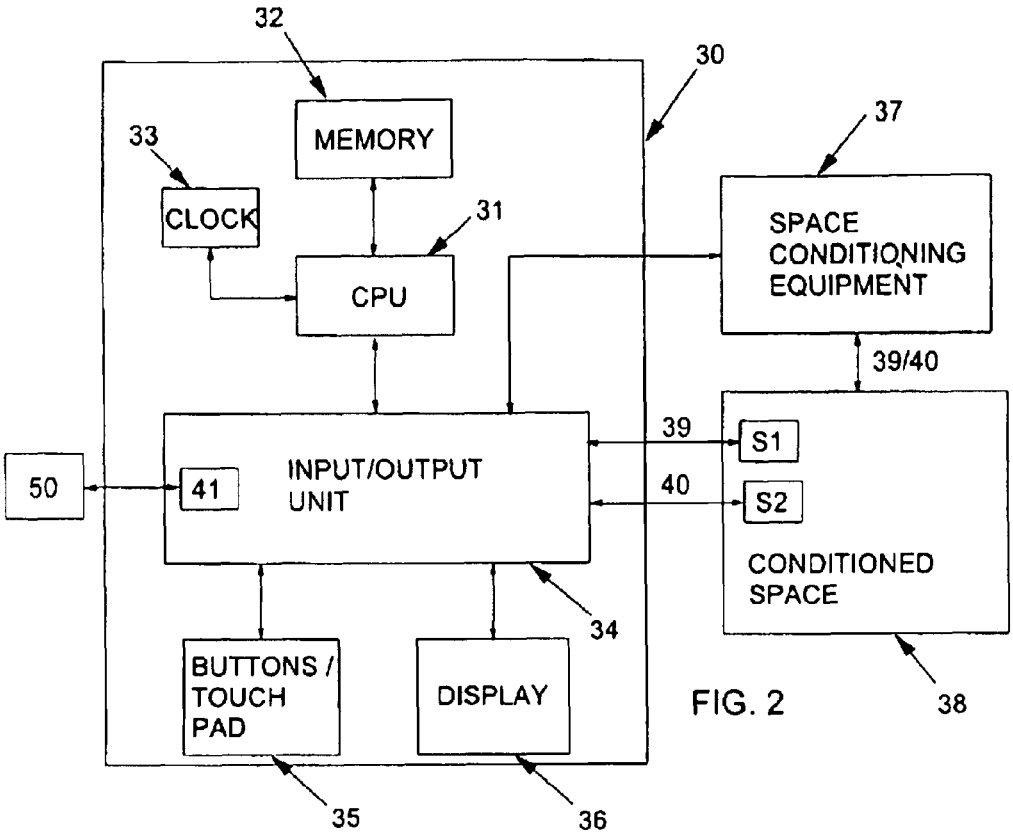
FIG. 2 is a block diagram of a central control device and its relationship to environmental control equipment, the conditioned space, and remote sensors.

Referring now to FIG. 2, central control device 23 is shown in a block diagram form with a processor 30 connected to an environmental temperature sensor S1 and an occupancy sensor S2 which are disposed with access to conditioned space 38. The processor 30 and the sensors S1 and S2 may be situated in a common housing (not shown) or separated, all as very well known in the art, so that said sensors have effective access to the room in which the housing for processor 30 is located.

The processor 30 includes a central processing unit (CPU) 31 in communication with a memory 32 which stores data and program information and also, via an input/output unit (I/O unit) 34, an optional user interface 35 and a liquid crystal or other type display (LCD) 36. The memory 32 may include a read-only part which is factory-programmed and a random-access part which stores data subject to change during operation. A settable real time clock 33 is used to keep time in the central control device to facilitate diverse operations, such as different temperature set points (desired temperatures), during different periods of the day cycle. The thermostat system may be suitably powered by a battery (not shown) and/or from equipment to which is connected. The I/O unit 34 includes a wired or wireless communications interface 41 for coordinating communications between the CPU 31 and one or more remote sensors.

Figure 3:
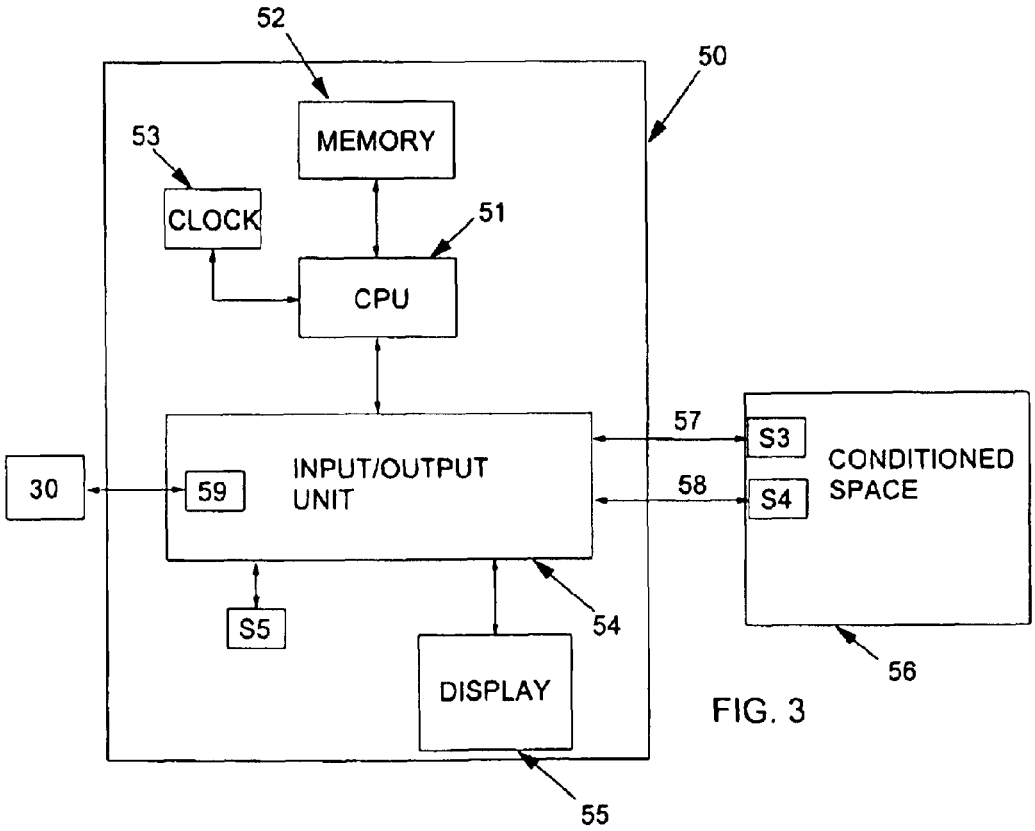
FIG. 3 is a block diagram of a remote sensor.

Referring now to FIG. 3, remote sensors 23A through 23F are shown in a block diagram form with a processor 50 connected to an environmental temperature sensor S3, an occupancy sensor S4, and device motion sensor S5 which are disposed with access to conditioned space 56. The processor 50 and the sensors S3, S4 and S5 may be situated in a common housing (not shown) or separated, all as very well known in the art, so that said sensors have effective access to the room in which the housing for processor 50 is located.

The processor 50 includes a central processing unit (CPU) 51 in communication with a memory 52 which stores data and program information and also, via an input/output unit (I/O unit) 54, and a liquid crystal or other type display (LCD) 55. The memory 52 may include a read-only part which is factory-programmed and a random-access part which stores data subject to change during operation. A settable [real time] clock 53 is used to keep time in the remote sensor to facilitate diverse operations, such as receiving and transmitting sensor signals. The remote sensor may be suitably powered by a battery (not shown) and/or from power supply integral with structure 10. The I/O unit 54 includes a wired or wireless communications interface 59 for coordinating communications between the CPU 50 and the central control device.

Thus, in the usual manner during normal operation, one or more environmental sensors send an electrical signal (e.g., if the sensor S1 is a simple thermistor, a resistance value; several types of temperature sensors are widely used) representative of the temperature within its local conditioned space (i.e., the room) which the processor can average to calculate a control value to compare against a previously entered set point to determine if control signals need to be sent to the space conditioning equipment 37. For example, if the control value temperature in the conditioned space is found to be too low when operation is in the heating mode, the processor 31 signals the space conditioning equipment 38 circulate, through ducts 39/40, air from/to the conditioned space 38 which is heated by the space conditioning equipment before return to the conditioned space. This heating phase continues until the calculated control value indicates that the space is now too hot (or approaching too hot) with reference to the set point such that the processor 31 sends signal(s) to the space conditioning equipment 38 to cease the heating function, all as very well known in the art. In a cooling mode, a counterpart procedure is followed. Those skilled in the art will understand that the control process typically includes such refinements as anticipation, hysterisis accommodation, fan control, etc. which are acknowledged, but are not directly relevant to the invention.

Figure 4:
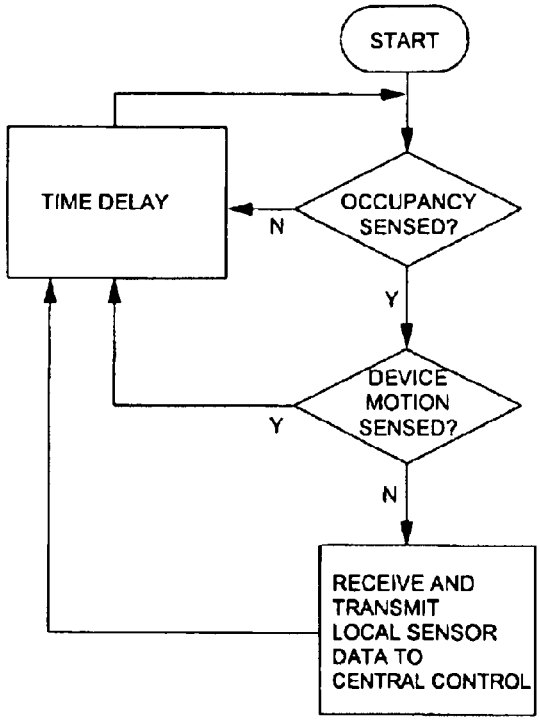
FIG. 4 is a high level process flow chart describing the operation of the remote sensor in a first embodiment.

Consider now a first embodiment of the invention referring to FIG. 4 as well as FIGS. 1, 2 and 3. Continuously or at one or more predetermined times of day (and/or on-demand if provided for in a sensor control program), occupancy sensor S4 determines whether or not its local conditioned space (i.e., a room) is occupied. An occupancy sensor S4 may detect motion in the room, the opening of doors 21 or 22, or the turning on of a light fixture 19, all of which indicate presence of a human occupant. Processor 50 comprises a sensor control program that determines whether occupancy sensor S4 has detected occupancy in conditioned space 56. If occupancy is not detected, the control program optionally waits a predetermined period of time before evaluating input from occupancy sensor S4 again or monitors such inputs continuously. If occupancy is detected, the sensor control program inquires to determine if an optional device motion sensor S5 has detected movement of the remote sensor from a resting or installation location. If remote sensor movement is detected, the control program optionally waits a predetermined period of time before evaluating input from occupancy sensor S4 again. If remote sensor movement is not detected, the control program receives input from environmental sensor S3 and transmits its signal (or value) to the central control device 23 for storage in memory of processor 30. Each remote sensor has a known data communications "address" so that a control program of the central control device can determine which remote sensor has transmitted sensor signals or values.

Figure 5:
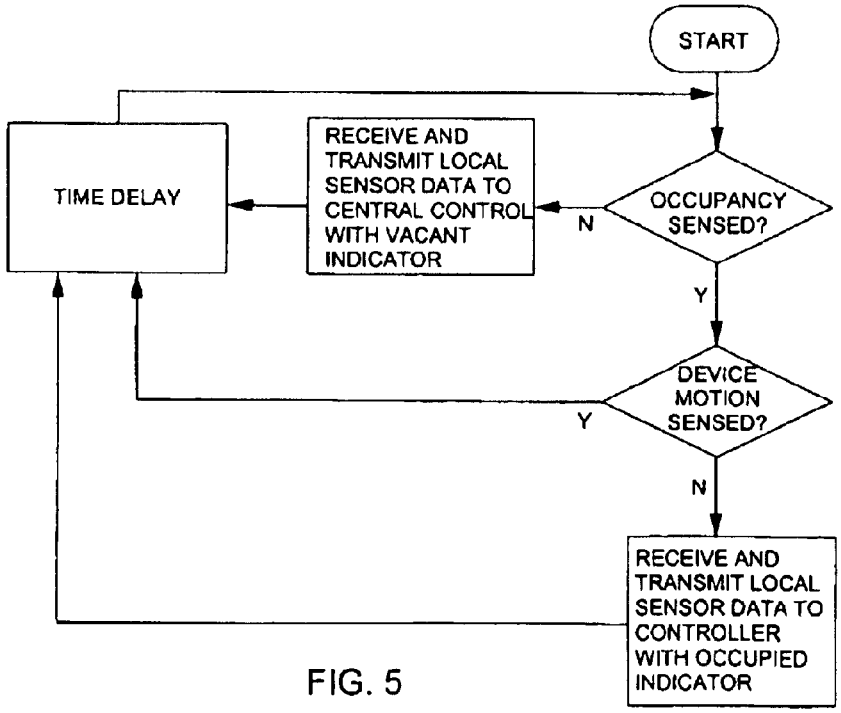
FIG. 5 is a high level process flow chart describing the operation of the remote sensor in a second embodiment.

Consider now a second embodiment of the invention referring to FIG. 5 as well as FIGS. 1, 2 and 3. Continuously or at one or more predetermined times of day (and/or on-demand if provided for in a sensor control program), occupancy sensor S4 determines whether or not its local conditioned space (i.e., a room) is occupied. An occupancy sensor S4 may detect motion in the room, the opening of doors 21 or 22, or the turning on of a light fixture 19, all of which indicate presence of a human occupant. Processor 50 comprises a sensor control program that determines whether occupancy sensor S4 has detected occupancy in conditioned space 56. If occupancy is not detected, the sensor control program receives and transmits to the central control device 23 the signals (or values) from environmental sensor S3 with signals indicating that the sensor value is associated with a vacant room. The remote sensor optionally waits a predetermined period of time before evaluating input from occupancy sensor S4 again. If occupancy is detected, the sensor control program inquires to determine if an optional device motion sensor S5 has detected movement of the remote sensor from a resting or installation location. If remote sensor movement is detected, the control program optionally waits a predetermined period of time before evaluating input from occupancy sensor S4 again. If remote sensor movement is not detected, the control program receives input from environmental sensor S3 and transmits its signal (or value) to the central control device 23 for storage in memory of processor 30 with signals indicating that the sensor value is associated with occupied room. Each remote sensor has a known data communications "address" so that a control program of the central control device can determine which remote sensor has transmitted sensor signals or values.

Figure 6:
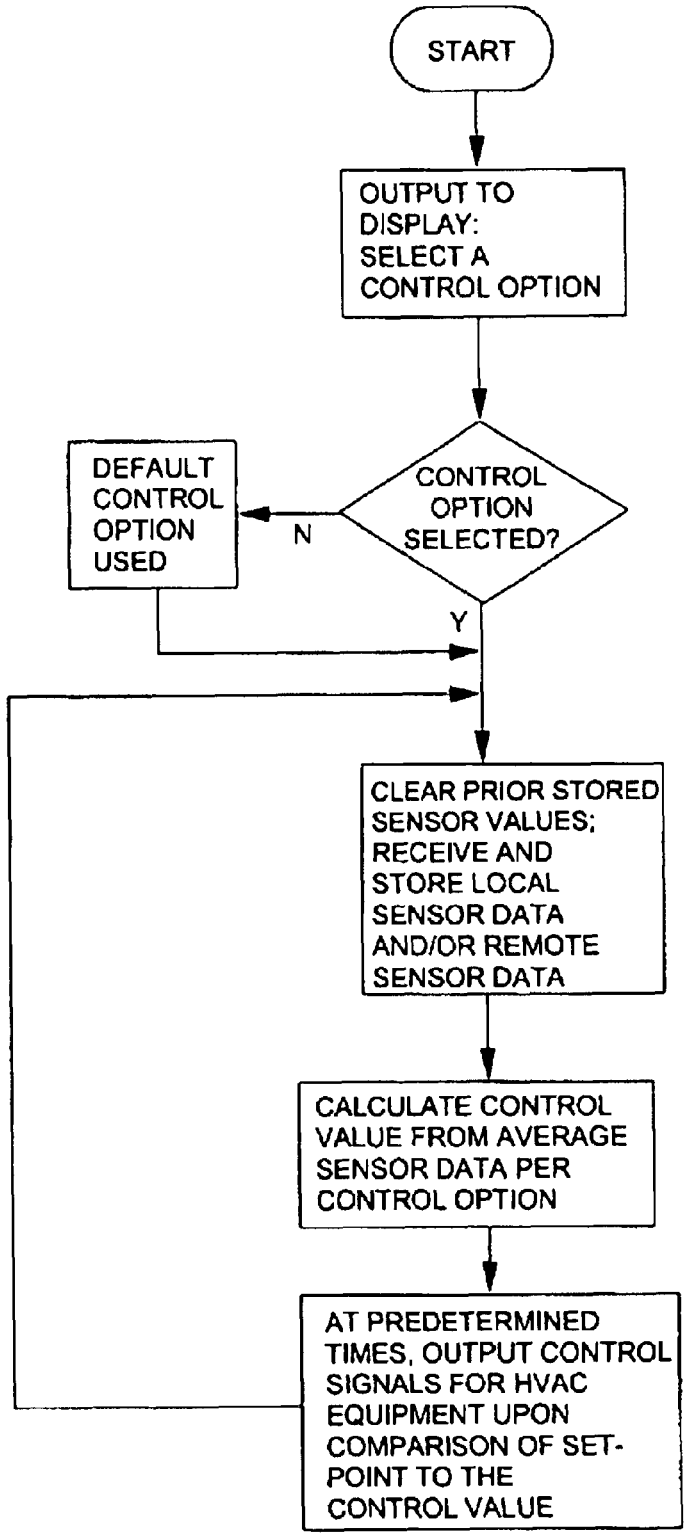
FIG. 6 is a high level process flow chart describing the operation of the central control device in the invention thermostat system.

Consider now the first and second embodiments of the invention referring to FIG. 6 as well as FIGS. 1 through 5. At the start of a portion of a control program for the central control device 23, a user may select one of a set of averaging methods for environmental sensor values stored in memory 32 to generate a control value to compare with a setpoint for control of equipment 38. The control program determines whether or not a user has selected an averaging method. If no averaging method is selected, a default method is used for averaging said environmental sensor values. In one form, the default averaging method adds together all stored sensor values in a data table and divides them by the number of sensor values to arrive at a control value. This form of averaging is referred to herein as the simple form. After an averaging method is selected, previously stored sensor values in the data table are erased and new sensor values are received and stored in the data table. Alternately, previously stored values from the data table are stored with an associated current time and date so that historical occupancy and vacancy may be determined for a particular room of structure 10. New values of sensors S1 and/or S3 are received into a data table in memory 32 of the central control device to be used for averaging environmental condition values detected in certain rooms of structure 10. The averaging calculation results in a control value used in comparison with a previously input setpoint to control operation of equipment 38 for changing an environmental condition in the conditioned space of structure 10.

If the central control device is programmable, the control program installed during manufacture will provide for user entry of above user input following conventional instructions similar to those used in user-programming the climate control operation of the thermostat system.

As used herein, a second form of averaging uses weighting of values of environmental conditions detected by environmental sensors S1 and S3 in occupied rooms depending on square footage of the room where the sensor is located. Greater weighting is assigned to sensor data in rooms with greater relative square footage. For an example using the environmental condition of temperature, assume that room 13 is four times the size of room 15 in structure 10. If rooms 13 and 15 are the only ones occupied, the second form of averaging would divide the sensed temperature at central control device 23 by 0.80 and the sensed temperature at remote sensor 23C by 0.20 to arrive at the control value. The denominator in the divisions is arrived at by the pro rata amount of space or square footage of the rooms relative to each other.

For the second embodiment of the invention, a third form of averaging uses weighting of values of environmental conditions detected by environmental sensors S1 and S3 in occupied and unoccupied rooms and assigns greater weight to sensor data from occupied rooms. For an example using the environmental condition of temperature, assume that rooms 13 through 15 are occupied and the rest vacant. The third form of averaging would divide the sensed temperatures at central control device 23 and remote sensors 23B and 23C by 0.90 and the sensed temperatures at the remained of the remote sensors by 0.10 to arrive at the control value. The denominator in the divisions is arrived at determining the value of conditioning the air in the unoccupied rooms.

A fourth form of averaging uses historical data to determine rooms most heavily occupied over a pre-determined period (such as a week or month) and averages current sensor data only from those heavily occupied rooms to arrive at a control value that may or may not depend on current occupancy. Historical data would indicate that, for example, rooms 13, 15 and 17 are occupied above a predetermined threshold level, i.e., three times per week or fifteen times per week. For those rooms where historical data indicated frequent occupancy and in the second embodiment of the invention, the environmental sensor data used to determine a control value would be those environmental conditions from occupied rooms and those environmental conditions from rooms where there is frequent occupancy regardless of current occupancy status. This form of averaging anticipates actual occupancy of a room. However, if a mobile environmental sensor it moved from one room to another and such motion is detected as above, historical environmental data for the moved sensor will be erased for the purposes of averaging in this embodiment of the invention. Environmental sensor data must begin anew with respect to room occupancy for a moved environmental sensor.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. An occupancy response system with a central control device adapted to control space conditioning equipment affecting a conditioned space, the central control device located at a single physical location in one of multiple rooms comprising the conditioned space, where remote sensors are located in physical locations substantially apart from the central control device, the improvement comprising:

A) two or more environmental sensors adapted to measure a local environmental condition and generate signals indicating its value;

B) two or more occupancy sensors adapted to detect occupancy of space around an environmental sensor and generate signals indicating occupancy;

C) either the central control device and one or more of the remote sensors or two or more of the remote sensors each comprise an environmental sensor and an occupancy sensor;

D) a central processor for the central control device including:

1) a central processing unit;

2) a real time clock;

3) a memory coupled to said central processing unit for storing a central control program and data, said data including at least one of the values of the environmental conditions sensed by the environmental sensors; and 4) an input/output unit coupled to the central processing unit, to the space conditioning equipment for issuing control signals thereto, and to a reception interface adapted to receive signals representing environmental conditions at a remote sensor;

E) a remote processor for each of the remote sensors including a central processing unit, a [real time] clock, a memory coupled to said central processing unit for storing a transmission control program, and an input/output unit coupled to the central processing unit and to a transmissions interface adapted to send to the central control device signals representing environmental conditions from a coupled environmental sensor; and F) for the central control device or remote sensors having environmental sensors and occupancy sensors, their input/output units further including a sensor input coupled to an environmental sensor and an occupancy input coupled to an occupancy sensor;

G) the control programs causing a coupled central processing unit to selectively:

1) detect occupancy or vacancy of a nearby space from signals from a coupled occupancy sensor;

2) read current signals from a coupled environmental sensor and transmit them for storage in the memory of the central control device only if occupancy is detected;

3) for the central control program, calculate an average of the received environmental sensor values and use the average result as a control value which is compared with a setpoint stored in the memory of the central control program to determine actuation of the space conditioning equipment.

2. The system of claim 1 wherein averaging of received environmental sensor values is calculated by simple averaging or a weighted averaging depending on relative spaces of occupied rooms.

3. The system of claim 2 wherein a display and a user interface are coupled with the input/output unit of the central processing device so the central control program causes a display of averaging methods for averaging received environmental sensor values.

4. The system of claim 3 wherein the central control program further causes a display indicating that a user may select an averaging method through the user interface and thereafter accepting user input selecting one of the averaging methods.

5. The system of claim 1 wherein the space conditioning equipment comprises zone control means so that only occupied rooms have their space affected by the space conditioning equipment.

6. An occupancy response system with a central control device adapted to control space conditioning equipment affecting a conditioned space, the central control device located at a single physical location in one of multiple rooms comprising the conditioned space, where remote sensors are located in physical locations substantially apart from the central control device, the improvement comprising:

A) one or more environmental sensors adapted to measure a local environmental condition and generate signals indicating its value;

B) one or more occupancy sensors adapted to detect occupancy of space around an environmental sensor and generate signals indicating occupancy;

C) either the central control device and one or more of the remote sensors or two or more of the remote sensors each comprise an environmental sensor and an occupancy sensor;

D) a central processor for the central control device including:

1) a central processing unit;

2) a real time clock;

3) a memory coupled to said central processing unit for storing a central control program and data, said data including at least one of the values of the environmental conditions sensed by the environmental sensors; and 4) an input/output unit coupled to the central processing unit, to the space conditioning equipment for issuing control signals thereto, and to a reception interface adapted to receive signals representing environmental conditions at a remote sensor;

E) a remote processor for each of the remote sensors including a central processing unit, a [real time] clock, a memory coupled to said central processing unit for storing a transmission control program, and an input/output unit coupled to the central processing unit and to a transmissions interface adapted to send to the central control device signals representing environmental conditions from a coupled environmental sensor; and F) for the central control device or remote sensors having environmental sensors and occupancy sensors, their input/output units further including a sensor input coupled to an environmental sensor and an occupancy input coupled to an occupancy sensor;

G) the control programs causing a coupled central processing unit to selectively:

1) detect occupancy or vacancy of a nearby space from signals from a coupled occupancy sensor;

2) read current signals from a coupled environmental sensor and a coupled occupancy sensor and transmit them for storage in the memory of the central control device so that values of environmental conditions are associated with their source of occupied or unoccupied rooms;

3) for the central control program, calculate an average of the received environmental sensor values and use the average result as a control value which is compared with a setpoint stored in the memory of the central control program to determine actuation of the space conditioning equipment.

7. The system of claim 6 wherein averaging of received environmental sensor values is calculated by simple averaging or a weighted averaging where environmental condition values from occupied rooms are given substantially more value than those of vacant rooms.

8. The system of claim 6 wherein where occupancy sensors include infra-red motion detectors.

9. The system of claim 6 wherein environmental sensors include temperature sensors and humidity sensors.

10. The system of claim 7 wherein a display and a user interface are coupled with the input/output unit of the central processing device so the central control program causes a display of averaging methods for averaging received environmental sensor values.

11. The system of claim 10 wherein the central control program further causes a display indicating that a user may select an averaging method through the user interface and thereafter accepting user input selecting one of the averaging methods.

12. The system of claim 6 wherein the space conditioning equipment comprises zone control means so that only occupied rooms have their space affected by the space conditioning equipment.

13. The system of claim 6 wherein a device motion sensor is coupled to the remote sensor's input output unit so that movement of the remote sensor results in transmission of a movement signal of the device motion sensor to be received by the central control device from the remote sensor and said movement signal is associated with previously received environmental sensor signals from said remote sensor and used for said averaging.

14. The system of claim 13 wherein the central control program of the central control device acts to remove data associated with said movement signal from calculations averaging environmental signals to arrive at a control value.

15. The system of claim 13 wherein the transmission control program of the remote sensor acts to stop transmission of environmental sensor signals to the central control device for a predetermined period of time after receipt of a movement signal.

* * * * *